United States Patent [19]

Redlich et al.

[11] Patent Number: 4,912,409
[45] Date of Patent: Mar. 27, 1990

[54] ACTUATOR DISPLACEMENT TRANSDUCER HAVING EXTERNAL FLUX EXCLUDING TUBE

[75] Inventors: Robert W. Redlich; Christopher G. Scheck, both of Athens, Ohio

[73] Assignee: Sunpower, Inc., Athens, Ohio

[21] Appl. No.: 338,363

[22] Filed: Apr. 10, 1989

Related U.S. Application Data

[63] Continuation of Ser. No. 147,241, Jan. 22, 1988, abandoned.

[51] Int. Cl.⁴ .................. G01B 7/14; H01F 21/02; H01Q 7/00
[52] U.S. Cl. .................. 324/207.13; 336/30; 340/870.31
[58] Field of Search .............. 324/207, 208, 226, 262; 336/30, 45, 75, 77, 84 R, 84 C, 84 M, 130, 136; 340/870.31, 870.32, 870.33, 870.34, 870.35, 870.36

[56] References Cited

U.S. PATENT DOCUMENTS

| | | | |
|---|---|---|---|
| 3,001,183 | 9/1961 | McKenney et al. | 336/136 |
| 3,654,549 | 4/1972 | Maurer et al. | 336/45 |
| 4,406,999 | 9/1983 | Ward | 324/208 |
| 4,502,006 | 2/1985 | Goodwin et al. | 324/208 |

Primary Examiner—Reinhard J. Eisenzopf
Assistant Examiner—Walter E. Snow
Attorney, Agent, or Firm—Frank H. Foster

[57] ABSTRACT

A linear displacement transducer has an elongated current conducting, tubular coil which is mounted to an end cap in a hydraulic or pneumatic cylinder and extends into a hole bored in the piston/piston rod unit within the cylinder. An electrically conducting, nonferromagnetic tube lines the wall of the bore and reciprocates axially with the piston/piston rod unit varying its overlap of the coil and thereby varying the inductance of the coil at an applied frequency. An AC electrical energy source is connected to apply an AC signal to the coil, the frequency of this signal being at least high enough that the skin depth in the tubular wall is less than the physical depth of the tubular wall. A detector circuit means is connected to the coil for detecting a signal which is proportional to the coil inductance and therefore is proportional to the displacement of the piston/piston rod unit within the cylinder.

6 Claims, 2 Drawing Sheets

ACTUATOR DISPLACEMENT TRANSDUCER HAVING EXTERNAL FLUX EXCLUDING TUBE

This is a continuation of application Ser. No. 07/147,241, filed Jan. 22, 1988, now abandoned.

TECHNICAL FIELD

This invention relates generally to the measurement of displacement by the generation of a signal which is proportional to that displacement and more particularly relates to improvements in a linear displacement transducer of the type having an electrically conductive coil and a relatively movable, nonferromagnetic, electrically conductive tube which moves linearly with respect to the coil to vary its overlapping relationship to the coil and thereby vary the inductance of the coil. The improvement makes the transducer more suitable and practical for use in a fluid pressure actuator.

BACKGROUND ART

A linear displacement transducer of this type is shown in my previous U.S. Pat. No. 4,667,158 and is illustrated in FIG. 1. The transducer is a helical coil 2 of an electrical conductor wound at a uniform pitch on a cylindrical, thin-walled tube or bobbin 1 of an electrical insulator or a poor conductor such as stainless steel. Preferably, the tube has suitable properties for use as a dry bearing surface, for example Teflon. The helical coil 2 is fixed to the first of two relatively movable bodies for which the relative displacement is to be measured.

A nonferromagnetic, electrically conducting rod or preferably a tube forms a core 3 which is slidable within the bobbin 1. It is made, for example, of aluminum or copper and is fixed to the second of the two relatively moving bodies.

Preferably the coil is surrounded by a low and constant reluctance path so that changes in coil inductance with respect to core 3 movement is maximized. This is preferably accomplished by positioning a material, such as ferrite 5, having a high magnetic permeability, but low electrical conductivity surrounding the coil. This material provides the desired low magnetic reluctance which not permitting the formation of significant eddy currents and not exhibiting a substantial skin effect.

Preferably this high permeability, low conductivity material is itself surrounded with a tubular shield 4 of high electrical conductivity to confine the field of the coil to the ferrite 5 and the skin effect layer of the shield 4 and to prevent external fields from linking with the coil 2. The shield 4 confines the magnetic flux generated by the current in the coil 2 and shields it from stray fields over a wide frequency range. It is preferably made of a material having both high electrical conductivity and high magnetic permeability, such as soft iron or low carbon steel.

An AC electrical energy source 6 and a detector circuit means 7, preferably in the form of a bridge circuit, are electrically connected to the coil 2. The AC source 6 operates at a frequency, preferably in the range of 50-200 Khz, which may be designated a carrier frequency $f_c$. An important key to the efficient and effective operation of a transducer of this type is that the frequency of the source 6 be high enough that the skin depth in the core 3 is substantially less than the radius of the core and less than the thickness of the wall of the tube.

The source 6 drives the coil through a resistor 8 which has a resistance which is much greater than the inductive reactance of the coil and its associated structures so that effectively the transducer is driven by a current source. Therefore, the voltage across the transducer coil 5 is approximately $(V/R)*(2 \pi f_c L)$.

The detector circuit 7 detects a signal at an AM detector 9 which is proportional to the inductance of the coil 2 and its associated structures. The coil voltage is proportional to coil inductance, which in turn is proportional to the displacement of the core 3.

In the operation of the basic concept of the displacement measurement apparatus of FIG. 1, the AC source 6 excites the bridge circuit, including the transducer coil 2 in one of its branches. Because of the skin effect at the frequency at which the AC source 6 is operating, magnetic fields in the core 3 are confined to a thin layer approximately equal to the sum of the skin depth in the core material which is typically on the order of 0.25 millimeters thick plus the spacing from the exterior of the core 3 to the interior of the coil 2. Because the skin depth is considerably less than the radius of the core, the magnetic flux is confined to a path in the region of the core 3 which has a considerably smaller cross-sectional area than the flux path where there is no core 3. Since reluctance is inversely proportional to the cross-sectional area of the flux path, the core 3 has the effect of substantially increasing the reluctance and therefore substantially reducing the magnetic flux in the region of the core. With the core 3 partially inserted in the coil 2 of the transducer, the interior of the coil 2 can be divided into the region occupied by the core 3 where magnetic flux is low, and the region unoccupied by the core where magnetic flux is relatively high compared to the core region. Therefore, the flux linkages of the coil are substantially reduced as a result of the insertion of the core and are reduced in proportion of the extent of the insertion of the core within the coil 2. This, in turn, proportionally reduces the self inductance of the coil 2. Thus, the movable core varies the self inductance and the impedance and therefore varies the voltage across the transducer in proportion to its displacement.

While a great variety of detector circuits are known to those skilled in the art for detecting a signal which is proportional to the changes in coil inductance or voltage, the detector circuit of FIG. 1 operates well. A bridge is designed to be brought into AC amplitude balance by adjustable resistor 10 when the core 3 is centered within the coil 2. The AC source 6 is a signal at a frequency $f_c$. The amplitude of the transducer signal at frequency $f_c$ at the node 11 of the bridge proportional to the displacement of the core 3. The amplitude of the balance signal at frequency $f_c$ at the opposite node 12 is adjusted so that it is equal to the amplitude of the transducer signal at node 11 when the core 3 is centered within the coil 2. A detector circuit means comprising two AM detectors 9A and 9B and a differential amplifier 14 are provided to detect the difference between the modulation amplitudes at the nodes 11 and 12.

The displacement of the core 3 is effectively providing an amplitude modulated signal at the terminal 11, the amplitude of which is proportional to displacement of the core 3 and may be detected by the AM detector 9B to provide an output signal which is directly proportional to the displacement of the core 3. The balance signal at node 12 is detected by an AM detector circuit 9A. The output signals from the two AM detectors 9A and 9B are applied to a differential amplifier 14, the output of which provides a signal $V_{out}$ which is proportional to the displacement of the core 3. Further details of the basic concept are described in more detail in my above cited U.S. Patent.

Embodiments of the invention, as described, can be applied or attached to relatively moving parts of substantially any machine. It is desirable to utilize such a device for detecting the displacement of a pneumatic or hydraulic cylinder such as used in control systems. Embodiments, as described above, can, of course, be attached externally in a variety of ways to such cylinders. However, exterior mounting would provide an additional, protruding structure on the cylinder which is unsightly, subject to damage, and would necessitate that additional space be allocated for it.

Therefore, the transducer is desirably positioned within the cylinder of the hydraulic or pneumatic actuator. In order for the transducer to be mounted in the actuator in a manner which does not interfere with the movement of the piston and its attached piston rod throughout its range of reciprocation within the cylinder, it is necessary that a hole be drilled into the piston/piston rod unit so that the transducer can be mounted on one end cap of the cylinder and can extend into the hole within the piston/piston rod. The transducer would extend completely into the bore in the piston when the piston is adjacent the end cap to which the transducer is connected.

The difficulty with using a transducer like the one illustrated in my above patent is that it would require a bore which is larger in diameter than manufacturers are willing to form in the piston/piston rod unit. Typically a maximum of 12 millimeters is permitted. Also, it would require that the slidable core be attached at the bottom of the bore to the piston/piston rod unit. Although the coil of the above embodiments of the invention are typically 6 to 10 millimeters in diameter, the addition of the externally surrounding ferrite and shield greatly increases the diameter of the transducer to typically on the order of 20 millimeters.

It is therefore an object and feature of the present invention to provide a displacement measuring transducer of the above type, but which can be mounted internally within such a cylinder in a considerably more efficient and less costly manner.

It is a further object and feature of the invention to provide a transducer of the above type which can have a coil diameter on the order of 6 to 10 millimeters, but not require a bore in the piston/piston rod unit of greater than 12 millimeters and to eliminate the need to attach a core at the bottom of the bore.

BRIEF DISCLOSURE OF INVENTION

The present invention improves the basic concept of the invention described above by providing an electrically conducting, nonferromagnetic wall around the exterior of at least a portion of the coil rather than a tube within the coil. Preferably the coil is mounted to an end cap of the cylinder and extends into a hole which is in and parallel to the axis of the piston/piston rod unit within the cylinder. The externally mounted electrically conducting, nonferromagnetic wall around the coil is preferably a tube which lines the hole.

Figure 1:
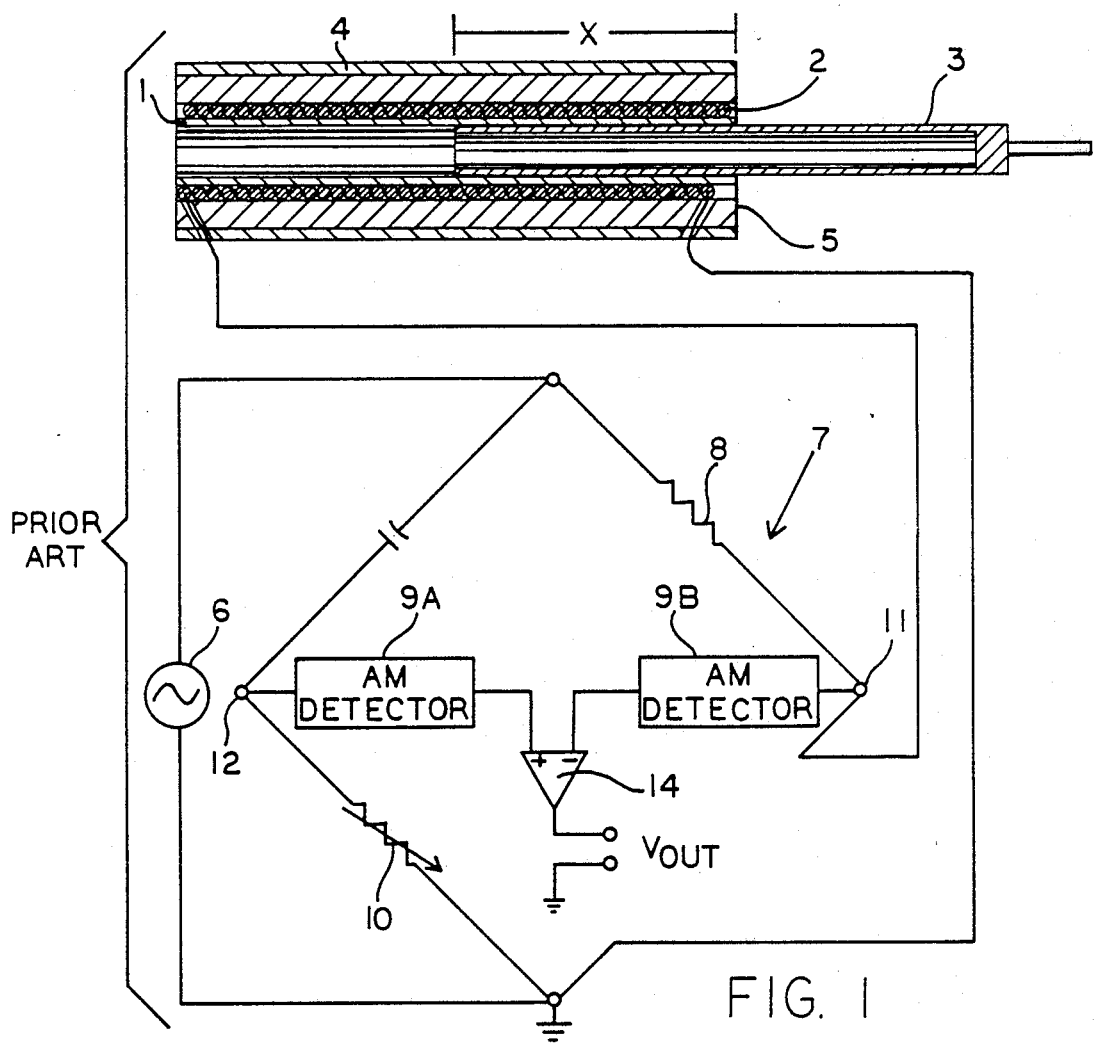
FIG. 1 is a schematic diagram of a prior art measuring apparatus in accordance with the above U.S. Pat. No. 4,667,158.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Figure 2:
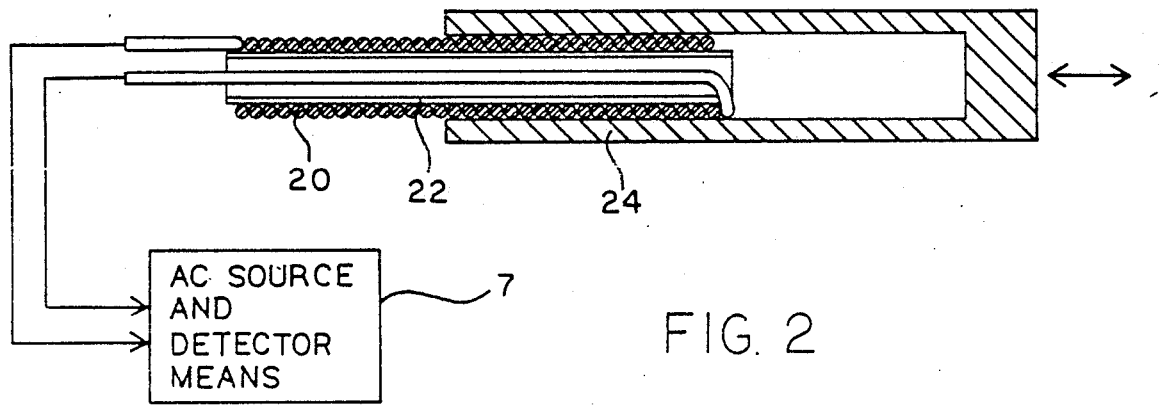
FIG. 2 is a simplified diagrammatic view of the present invention.

FIG. 2 illustrates a transducer embodying the present invention for use in an apparatus for measuring the relative displacement of two bodies. An elongated, current conducting coil 20 is wound upon a non-conducting coil form or bobbin 22. The coil 20 and its bobbin 22 are fixed to a first one of the two relatively moving bodies.

An electrically conducting, nonferromagnetic wall 24 is formed around at least a portion of the coil 20. Preferably, the wall 24 is a cylindrical tube, having a linear axis which is coaxial with the axis of the coil 20. The surrounding wall 24 is mounted to the second body so that it can reciprocate coaxially with it relative to the coil in order to vary the extent it overlaps the coil.

As with the apparatus of FIG. 1, an AC electrical energy source is connected to supply an AC signal to the coil 20. The frequency of that signal must be at least high enough so that the skin depth in the wall 24 is less than the physical depth of the wall. As a result, linear translation of the wall 24 will reduce the cross-sectional area of the flux path externally of the coil and therefore cause a substantially linear variation of the inductance of the coil 20 in a manner similar to the variations of the transducer in FIG. 1.

Figure 3:
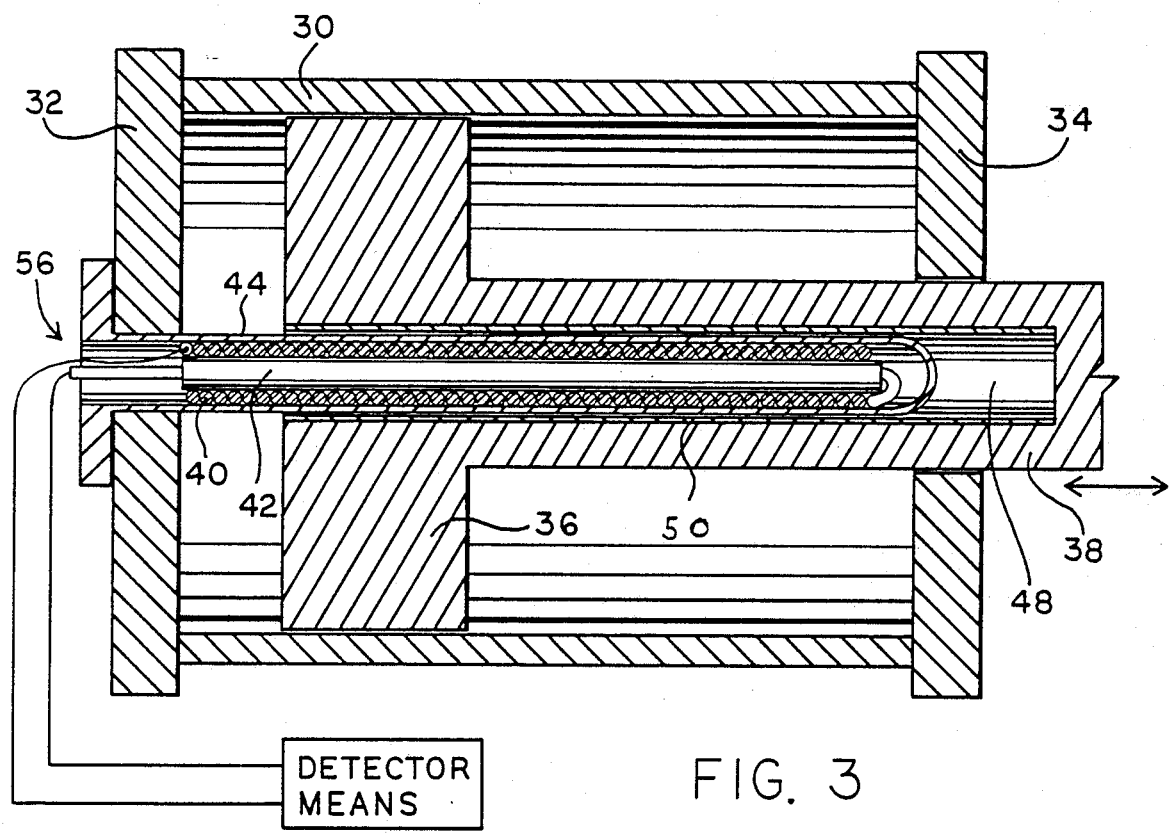
FIG. 3 is a diagrammatic view of an embodiment of the invention mounted within a fluid-pressure actuator.

FIG. 3 illustrates a preferred embodiment of the present invention installed in a fluid actuator cylinder 30. The fluid actuator cylinder 30 has a pair of conventional end caps 32 and 34 and a piston/piston rod unit 36 which is sealingly slidable in the cylinder. The piston rod 38 is sealingly slidable through the end cap 34 for connection to a mechanical component to be driven by the actuator. The coil 40 is wound upon a bobbin 42.

A fluid impervious, nonferromagnetic protective jacket 44 may protectively surround the coil 40 and extend through the end cap 32 to open to the exterior of the cylinder. The coil, along with the bobbin upon which it is wound, may be mounted to the end cap 32 by sliding it axially within the impervious jacket 44. This permits the electrical conductors which connect the coil 40 to the AC electrical energy source and detector circuit 54 to extend through the jacket opening 56.

Figure 4:
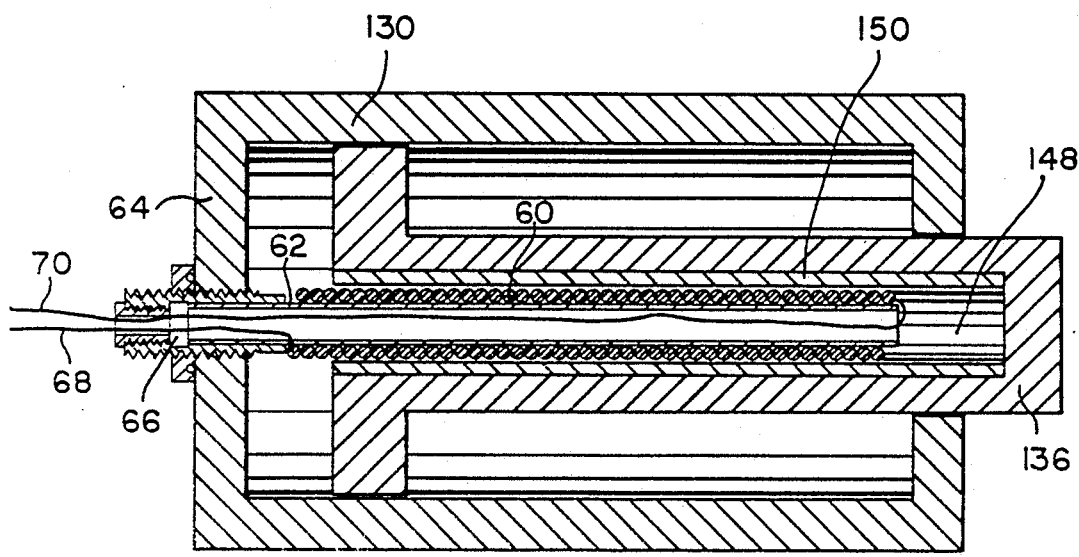
FIG. 4 is a diagrammatic view of the preferred embodiment of the invention.

Referring to FIG. 4, alternatively and preferably the coil 60 is simply formed on a bobbin 62 by insulated magnetic wire which protects the coil from the fluid and its environment. The bobbin is mounted directly to the end cap 64 and a conventional high pressure, wire feed through 66 is used for feeding the wires 68 and 70 through to the external circuitry. In this manner the protective jacket 44 of FIG. 3 may be eliminated so that the bore in the piston/piston rod can be less.

Referring to FIGS. 3 and 4 simultaneously, a hole 48 or 148 is bored into the end of the piston/piston rod unit 36 or 136 so that the protective jacket 34 if used and the coil 40 or 60 may extend into the hole 48 or 148 parallel to the axis of the piston/piston rod unit 36 or 136. An electrically conducting, nonferromagnetic, tubular wall, formed for example as a copper or aluminum sleeve 50 or 150, lines the hole 48 or 148 and serves to reduce the flux linkages by increasing the reluctance of the flux path exteriorly of the coil in the region adjacent the sleeve 50 or 150. In this manner the inductance is varied in proportion to piston/piston rod unit displacement.

It is desirable to shield the transducer and to provide a low reluctance flux path for the coil 40 or 60 in the absence of the tubular wall 50 or 150 which is varied solely by translation of the tubular wall 50 or 150 with respect to the coil 40 or 60. This is conveniently accomplished in the embodiment of FIG. 3 by the cylinder 30 or 130 which surrounds the piston/piston rod unit and is typically and conventionally constructed of a ferromagnetic material and the air gap between coil and cylinder. Thus, the cylinder itself cooperates with the transducer to shield the coil in the manner of the shield 4 and ferrite 5 of FIG. 1.

While certain preferred embodiments of the present invention have been disclosed in detail, it is to be understood that various modifications may be adopted without departing from the spirit of the invention or scope of the following claims.

I claim:

1. An improved apparatus for measuring the relative displacement of a piston/piston rod unit sealingly slidable within the ferromagnetic cylinder of a pressurized cylinder actuator, the improvement comprising:
   (a) an elongated, current conducting coil mounted at an end of the reciprocation path of the piston/piston rod unit;
   (b) an electrically conducting, non-ferromagnetic wall around at least a portion of the coil, said wall being mounted to and having an axis parallel to the axis of the piston/piston rod unit for telescoping axial reciprocation relative to the coil for varying the overlap of the coil by the wall to thereby vary the inductance of the coil in proportion to that overlap at an applied frequency;
   (c) said ferromagnetic cylinder providing a substantially constant flux path surrounding the nonoverlapped portion of the coil and a shield against external fields;
   (d) an AC electrical energy source connected to apply an AC signal to said coil, the frequency of the signal being at least high enough that the skin depth in said wall is less than the physical depth of said wall; and
   (e) a detector circuit means connected to the coil for detecting a signal which is proportional to the coil inductance.

2. An apparatus in accordance with claim 1 wherein the coil is helical with a linear axis and the wall is a tube lining a hole formed in the piston/piston rod unit and surrounding the coil.

3. An apparatus in accordance with claim 2 or 1 wherein a fluid impervious, non-ferromagnetic jacket surrounds the coil and is interposed between the coil and said wall for protecting the coil from the environment of the wall.

4. An apparatus in accordance with claim 2 in combination with a pressurized cylinder actuator of the type including end caps for sealing the ends of the cylinder and a piston/piston rod unit sealingly slidable in the cylinder,
   wherein said coil is mounted to an end cap and extends into a hole in and parallel to the axis of the piston/piston rod unit; and
   wherein the tubular wall is a sleeve lining said hole.

5. An apparatus in accordance with claim 4 wherein the hydraulic cylinder is a ferromagnetic material to form a shield around the coil and to provide a low reluctance flux path for the coil.

6. An apparatus in accordance with claim 5 wherein a fluid impervious, non-ferromagnetic jacket surrounds the coil within the cylinder, is interposed between the coil and said tubular wall and extends through said end cap to open to the exterior of the cylinder and wherein the electrical connections to the coil are made through the opening of the jacket.

* * * * *